United States Patent [19]
Alexander et al.

[11] 4,070,314
[45] Jan. 24, 1978

[54] PLYWOOD ADHESIVES USING AMYLACEOUS EXTENDERS COMPRISING FINELY GROUND CEREAL-DERIVED HIGH FIBER BY-PRODUCT

[75] Inventors: Richard J. Alexander, Wauwatosa; Robert K. Krueger, Sheboygan, both of Wis.

[73] Assignee: Krause Milling Company, Milwaukee, Wis.

[21] Appl. No.: 730,503

[22] Filed: Oct. 7, 1976

[51] Int. Cl.$^2$ .................... C08L 3/02; C08L 5/00
[52] U.S. Cl. ................................ 260/17.3; 428/528
[58] Field of Search .................. 260/17.3; 428/528

[56] References Cited
U.S. PATENT DOCUMENTS

| 2,727,869 | 12/1955 | Ash et al. | 260/17.2 |
| 2,967,836 | 1/1961 | Moffitt et al. | 260/17.2 |
| 3,093,604 | 6/1963 | Ayers | 260/17.3 |

FOREIGN PATENT DOCUMENTS

| 120,284 | 8/1945 | Australia | 260/17.3 |

Primary Examiner—Edward M. Woodberry
Attorney, Agent, or Firm—Wheeler, Morsell, House & Fuller

[57] ABSTRACT

A high fiber-containing fraction from a cereal grain or oilseed is combined with other high fiber-containing fractions to provide 30–100% of an extender, with cereal flours or starches providing 0–70%, and the mixtures are used as amylaceous extenders which are particularly useful in producing adhesives for the bonding of wood such as veneers in the production of products such as plywood.

9 Claims, 1 Drawing Figure

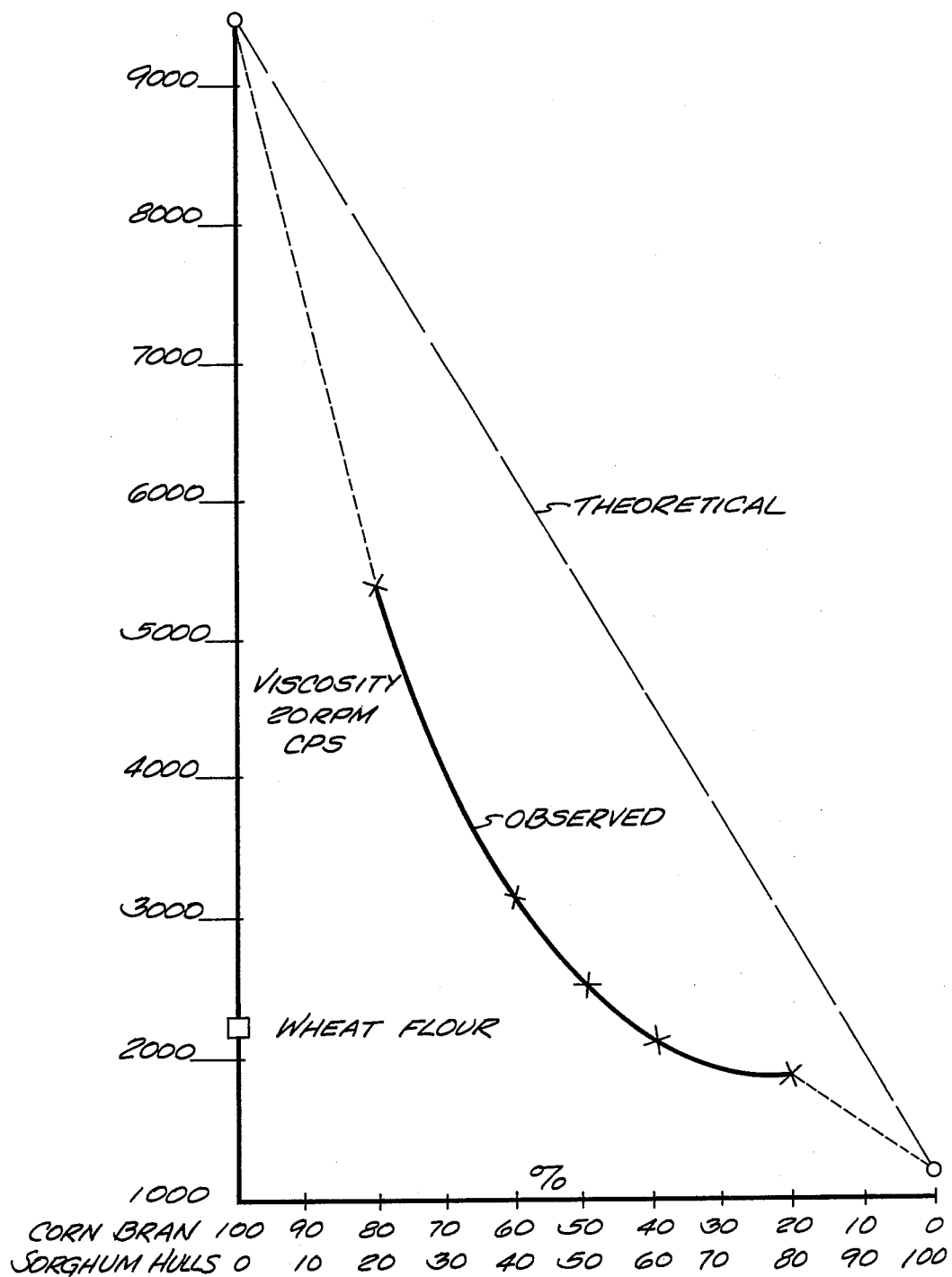

PLYWOOD ADHESIVES USING AMYLACEOUS EXTENDERS COMPRISING FINELY GROUND CEREAL-DERIVED HIGH FIBER BY-PRODUCT

BACKGROUND OF THE INVENTION

Plywood has been defined as a crossbonded assembly made of layers of veneer (a thin layer or sheet of wood) in combination with a core of lumber or of plies joined with an adhesive. The grain of alternate layers of veneer is crossed, generally at right angles, which provides a panel with improved strength and dimensional stability compared to the original wood.

To describe a veneer plywood completely it is necessary to indicate three criteria including the species or group of timber, the grade of veneer, usually confined to the face and back veneers, and the bond or type of adhesive used. These factors generally limit the application in which the plywood can be employed.

This invention will be concerned mainly with plywood having a novel type of adhesive, and with the adhesive which is used.

Casein, soy protein and various animal protein glues were the main plywood adhesives employed up until 1935, when the first phenolic resins were developed, primarily for exterior plywood use. Since 1935, most of the protein-based glues have been replaced by synthetic resins. These include urea-formaldehyde, melamine-formaldehyde, resorcinol-formaldehyde, phenol-formaldehyde, phenol/resorcinol-formaldehyde, polyvinyl alcohol and polyvinyl alcohol/urea-formaldehyde resins.

The most commonly used resins are the urea-formaldehyde and phenol-formaldehyde resins. Plywood adhesives made from urea-formaldehyde resins are used extensively for interior and intermediate grades of plywood. This covers the majority of hardwood plywood produced. Adhesives made from phenol-formaldehyde resins are used for softwood plywood production, and are also standard for exterior grades of plywood.

In most plywood adhesive formulations, the synthetic resin is combined with various fillers and extenders, which not only reduce the overall cost of the adhesive but also perform various functions in the adhesive system. Fillers are added primarily to reduce the cost of the plywood adhesive. Materials such as finely ground clays, wood-fiber based products, such as wood, bark, walnut shell and coconut shell flours, as well as fibrous residues from the production of furfural have been employed. In addition to cost reduction, these products add particulate matter to the adhesive. This particulate matter assists in reducing penetration of the resins into the wood and fills small cavities between veneers, thus preventing starved joints.

Extenders are usually amylaceous containing materials, such as cereal flours and starches. In phenol-formaldehyde glues, these extenders provide a source of starch, which becomes gelatinized under the highly alkaline conditions present in phenolic resin systems. The gelatinized starch provides the glue with increased viscosity and tack. These properties allow for more control of the glue during application, provide improved glue lines and limit penetration of the resin into the wood plies.

With urea-formaldehyde glues, most amylaceous materials are not satisfactory. Since urea-formaldehyde resins are neutral or slightly acidic and do not contain alkali, the starch does not become gelatinized to provide increased viscosity to the adhesive system. Precooked or pregelatinized starches have been considered as extenders in urea-formaldehyde glues. However, they are more expensive, more difficult to use, and are not commonly used in plywood manufacture today.

Wheat flours are the only principal starch-based extenders that are employed today in urea-formaldehyde plywood glues. These products are unique in that they can provide viscosity in certain adhesive systems without the starch portion of the flour becoming gelatinized. This property is usually associated with the gluten protein portion of wheat flours. Wheat gluten has considerably different properties compared to the protein portions of other cereals, such as corn, rice, sorghum, etc. The gluten protein of wheat is responsible for the dough forming properties which make wheat flours particularly useful in the production of bread, cakes, pasta and related bakery products.

We have found that certain high fiber-containing by-products from the grain milling and processing industries can function as extenders in producing urea-formaldehyde plywood glues or adhesives that are comparable to those made with wheat flours. These materials include cereal grain milling by-products, such as corn bran, sorghum bran, oat hulls, barley hulls, rice hulls, rice bran and wheat bran, oilseed processing by-products such as soybean hulls and cottonseed hulls, and cereal grain processing by-products, such as spent brewers grains, expelled or extracted corn germ and malt husks.

This was an unexpected finding since by-products such as corn bran, oat hulls, soybean hulls, etc., have heretofore been thought to have no industrial utility, and have previously been employed mainly as inexpensive ingredients for animal feeds. These products are generally quite crude in composition and contain portions of the endosperm of the grain as well as high levels of cellulose and hemicellulose. The latter components in particular have not been considered as useful ingredients in adhesive applications.

A novel feature of this invention is that these high fiber products contain less than 50% starch and usually contain less than 30% starch while most amylaceous materials used in plywood adhesives, such as cereal flours and starches, contain from 80 to 100% starch.

An advantage of this invention is that the high fiber products are less expensive than most cereal flours and starches normally used in the manufacture of plywood glues. This feature provides an economic advantage to those associated with the production of plywood glues and the manufacture of plywood.

We have found that the high fiber products of this invention produce urea-formaldehyde plywood adhesives that are comparable in viscosity to those produced with wheat flours. This discovery appears to be related to the unique water absorption properties of the high fiber materials, which properties are two to four times greater than those of cereal flours and starches. This water absorption property provides increased viscosity to the urea-formaldehyde glue system, similar in effect to the properties of the gluten protein which is associated with wheat flours commonly used in this application.

We have found that this unique water absorption property appears to be associated with the composition of the products. In particular, water absorption is related to a combination of the % of pentosans and % of protein of the fibrous products.

We have also found that in some cases the water absorption properties of individual fibrous products are too great, so that the final urea-formaldehyde glue viscosity is too high for practical use. This may appear to be a disadvantage in using these products. However, with the improved method of the present invention, by combining selected amounts of selected fibrous products that produce high viscosity glues with selected amounts of other products such as selected cereal flours or starches, that produce low viscosity glues, which normally are not satisfactory, mixtures that produce satisfactory glue viscosities for urea-formaldehyde plywood manufacture are obtained. We have further discovered that certain selected high fibrous material can be combined to produce mixtures having the proper water absorption properties for use in urea-formaldehyde plywood adhesives.

We have found that an unexpectedly high percentage of a fibrous material yielding high glue viscosities can be combined with those products which produce low viscosity glues to provide a mixture imparting a satisfactory viscosity to urea-formaldehyde adhesives. This negative synergistic action affords the economic advantage of allowing the use of large percentages of the less expensive fibrous materials to produce plywood glues having properties comparable to those glues formulated with the more expensive wheat flours.

The combination of high fiber-containing products with cereal flours or starches offers the additional advantage of utilizing materials in an application where previously none of these products could be satisfactorily employed.

SUMMARY OF THE INVENTION

We have discovered that cereal grain or oilseed processing by-products having a relatively high fiber content or mixtures of these high fiber by-products with cereal flours or starches produce particularly useful amylaceous extenders for urea-formaldehyde plywood adhesives. We have also found that the less expensive novel extenders of this present invention can serve as replacements for the more costly wheat flour extenders in urea-formaldehyde plywood adhesives without significantly altering their performance properties.

DESCRIPTION OF THE DRAWING

In the drawing, the FIGURE is a graph showing the negative synergistic viscosity effect of Table III.

DESCRIPTION OF THE INVENTION

The amylaceous extenders of the present invention may be obtained by employing the fiber-containing fractions of a cereal grain or oilseed. These fractions may be obtained from the wet or dry milling of corn, wheat, sorghum, oats, barley or rice, or from the processing of soybeans or cottonseeds, or further from the residues of the brewing or distilling industries. These high fiber-containing products can include corn bran, sorghum bran, rice hulls, wheat bran, oat hulls, barley hulls, rice bran, malt husks, soybean hulls, cottonseed hulls, expelled or extracted corn germ, spent brewers grains and the like.

The high fiber-containing products may also be combined with other auxiliary amylaceous materials to produce adhesive extenders of the present invention. These auxiliary amylaceous materials include cereal flours and starches or fractions thereof, which may be derived from corn, sorghum, wheat, rice, barley, oats or other cereal grains.

The percentage of high fiber-containing product in the extender may be varied from 30 to 100%, while the percentage of auxiliary amylaceous material may be varied from 0 to 70%.

If mixtures of fibrous products, or mixtures of fibrous products with auxiliary amylaceous materials are desired, the individual components may be blended together by any convenient type of blending equipment which provides a homogeneous mixture. This blending equipment can include, but is not limited to, "V" blenders, ribbon blenders, screw mixers, Hobart blenders, etc.

To prepare the urea-formaldehyde plywood adhesives, the amylaceous extenders of this invention are typically combined with water, catalyst, filler and resin. The mixture is blended in a convenient type of blending equipment to give a homogeneous dispersion. The order of ingredient addition is generally not critical. The mixing time is usually held to 10–30 minutes.

The amount of extender in the adhesive may be varied from 10 to 40% by weight of the total glue mix, depending on the glue viscosity required. The amount of water may be varied from 25 to 60%, the catalyst from 1 to 4%, the filler from 2 to 4% and the resin from 20 to 40%. The amount of resin added will depend on the solids level of the resin, which may vary from 40 to 100%, depending on the manufacture of the resin.

The following specific examples are set forth to more fully describe but are not intended to limit the scope of this invention.

EXAMPLE 1

Fibrous By-Products:

Various finely ground fibrous cereal-derived by-products were tested as glue extenders in comparison to wheat flour. The important property of glue viscosity as measured by a Brookfield viscometer at room temperature was used for the comparisons. These materials were compared in the following glue formula, and the initial glue viscosity results are shown in Table I.

| Material | Parts by Wt. |
| --- | --- |
| Water | 228 |
| Catalyst | 21 |
| Filler | 25 |
| Extender | 175 |
| Hobart mixed for 5 minutes | |
| Urea-formaldehyde resin | 420 |
| Hobart mixed for 10 minutes | |

TABLE I

| Extender | 20 rpm Viscosity cps |
| --- | --- |
| Wheat flour | 2,150 |
| Rice hulls | 910 |
| Sorghum hulls | 1,240 |
| Oat hulls | 1,330 |
| Corn bran (dry milled) | 3,400 |
| Oat feed | 4,000 |
| Rice bran | 5,000 |
| Barley hulls | 10,800 |
| Extracted corn germ | 16,000 |
| Wheat bran | 20,000 |
| Corn bran (wet milled) | 21,500 |
| Spent brewers grains | 35,000 |
| Malt husks | 62,000 |
| Soybean hulls | 97,000 |

In practical interior grade plywood production, the useful glue viscosity range is about 1000 to 5000 cps.

EXAMPLE 2

Fibrous By-Products Combined with Flours an Starches:

Various combinations of finely ground fibrous cereal-derived by-products with flours and starches were tested as glue extenders on the same basis and in the same glue formula as given in Example 1. The initial plywood glue viscosity results are listed in Table II.

TABLE II

| Extender | | | | Glue |
|---|---|---|---|---|
| Fibrous By-Product | % | Flour or Starch | % | 20 rpm Viscosity cps |
| Corn bran (dry milled) | 80 | Wheat starch | 20 | 1040 |
| Corn bran (dry milled) | 80 | Corn starch | 20 | 1070 |
| Soy hulls | 20 | Corn flour | 80 | 1350 |
| Corn bran (dry milled) | 35 | Sorghum flour | 65 | 1750 |
| Malt husks | 20 | Sorghum flour | 80 | 1780 |
| Oat feed | 70 | Sorghum flour | 30 | 1980 |
| Wheat bran | 35 | Sorghum flour | 65 | 2250 |
| Barley hulls | 50 | Sorghum flour | 50 | 2280 |
| Wheat bran | 30 | Sorghum flour | 70 | 2820 |
| Soy hulls | 30 | Corn flour | 70 | 3080 |
| Extracted corn germ | 50 | Sorghum flour | 50 | 3800 |
| Soy hulls | 40 | Corn flour | 60 | 5250 |

These results show that various combinations of material gave glues within the viscosity range useful for interior grade plywood production, whereas, alone, many of the fibrous by-products give glues which are too high in viscosity while the flours and starches yield glues which are too thin.

EXAMPLE 3

Fibrous By-Product Combinations:

Varying combinations of finely ground corn bran and sorghum hulls were tested as urea-formaldehyde plywood glue extenders. The glue viscosities were measured as described in Example 1 and are shown in Table III. The glues were mixed in a Hobart apparatus according to the following formulation.

| Material | Parts by Wt. |
|---|---|
| Water | 304 |
| Catalyst | 28 |
| Extender | 270 |
| mixed 5 minutes | |
| Urea-formaldehyde resin | 562 |
| mixed 10 minutes | |

TABLE III

| Extender | | Glue Viscosity |
|---|---|---|
| Corn Bran % | Sorghum Hulls % | 20 rpm cps |
| 100 | 0 | 9450 |
| 80 | 20 | 5400 |
| 60 | 40 | 3150 |
| 50 | 50 | 2480 |
| 40 | 60 | 2080 |
| 20 | 80 | 1880 |
| 0 | 100 | 1160 |

The negative synergistic viscosity effect as demonstrated by the results of Table III is most readily apparent from the plots as presented in the figure of the drawing.

EXAMPLE 4

Fibrous By-Products and Combinations in Other UF Glue Systems:

Various finely ground fibrous cereal-derived amylaceous materials and combinations of these materials were tested in other glue systems different than shown in the previous examples. The initial glue viscosities resulting from the following system are given in Table IV.

| Material | Parts by Wt. |
|---|---|
| Solid urea formaldehyde resin | 200 |
| Water | 300 |
| mixed 10 minutes | |
| Extender | 104 |
| Filler | 16 |
| Catalyst | 10 |
| mixed 10 minutes | |

TABLE IV

| Extender | Glue Viscosity at 32° C 20 rpm cps |
|---|---|
| Wheat flour | 1280 |
| 50% Corn bran/50% Sorghum hulls | 1390 |
| 80% Corn bran/20% Sorghum flour | 1640 |
| Corn bran | 2000 |

The initial glue viscosities resulting from the following different formulation are shown in Table V.

| Material | Parts by Wt. |
|---|---|
| Urea formaldehyde resin | 300 |
| Water | 150 |
| mixed 5 minutes | |
| Extender | 117 |
| mixed 10 minutes | |
| Catalyst | 16 |
| mixed 5 minutes | |

TABLE V

| | Glue Viscosity at 32° C 20 rpm cps |
|---|---|
| Wheat flour No. 1 | 720 |
| Wheat flour No. 2 | 840 |
| Wheat flour No. 3 | 1250 |
| 70% Corn bran/30% Sorghum flour | 1060 |
| 50% Corn bran/50% Sorghum hulls | 1070 |
| Corn bran | 2050 |

The above results demonstrate the broad utility of the materials of the present invention for producing suitable interior grade plywood glues.

EXAMPLE 5

Plywood Panels:

A 50:50 blend of finely ground corn bran-sorghum hulls was compared to a commercial wheat flour extender in urea-formaldehyde bonded plywood panels. The glue formulation was as follows:

| Material | Parts by Wt. |
|---|---|
| Urea formaldehyde resin | 210 |
| Water | 100 |
| Extender | 100 |
| Pecan shell flour | 15 |
| Urea | 15 |
| Catalyst | 12 |
| Dried blood | 5 |
| Sodium bisulfite | 1 |

These two glue systems were mixed in a Hobart apparatus until smooth in appearance. At 25° C, the 30 rpm Brookfield viscosities were 4600 cps for the wheat flour extended glue and 3100 cps for the bran-hulls extender. Shortly after mixing, the glues were roller spread on ⅛ inch virola core stock as a double glue line at the approximate rate of 95 lbs/1000 sq. ft. A birch face veneer (ca. 1/16 inch) and a lauan back veneer (ca 1/16 inch) were placed on either side of each core stock panel. Two sets of the three-ply panels were pressed per 4.8 minute cycle under about 350 psi at about 240° F.

After the panels had cooled, two random panels from each extended system were knifed as a qualitative test of bond strength. The wood failure rate of the corn bran-sorghum hulls extended glue appeared visibly better than that of the commercial wheat flour extended glue system.

After standing at room temperature for about 1 month, specimens were cut from randomly selected panels of each type for dry shear strength testing. The testing results are given in Table VI.

TABLE VI

| Extender | Average Loading kg | Average % Wood Failure |
|---|---|---|
| Commercial wheat flour | 32.2 | 66 |
| Corn bran-Sorghum hulls | 32.0 | 81 |

The results of this example demonstrate that the amylaceous materials of the present invention can be used successfully in commercial interior grade plywood production.

What we claim is:

1. An adhesive consisting of a combination of urea-formaldehyde resin present in the range of 20–40%, water in the range of 25–60%, filler in the range of 2–4%, catalyst in the range of 1–4%, and an amylaceous extender in the range of 10–40%, said amylaceous extender including 30–100% of a finely ground cereal-derived high fiber by-product containing less than 50% starch and 0–70% of an auxiliary amylaceous material said high fiber by-product being selected from the group comprising corn bran, sorghum bran, oat hulls, barley hulls, rice hulls, rice bran, wheat bran, oilseed processing by-products such as soy bean hulls and cottonseed hulls, spent brewers grains, expelled or extracted corn germ, and malt husks and said auxiliary amylaceous material being selected from the group of cereal flour, starch, or fraction thereof, derived from a cereal grain, the high fiber by-product being of a type having substantially greater water absorption properties than the auxiliary amylaceous material.

2. An adhesive as claimed in claim 1 in which the auxiliary amylaceous material comprises cereal flours, starches, or fractions thereof, derived from the group comprising corn, sorghum, wheat, rice, barley, oats, and cereal grains.

3. An adhesive consisting of a combination of urea-formaldehyde resin present in the range of 20–40%, water in the range of 25–60%, filler in the range of 2–4%, catalyst in the range of 1–4%, and an extender in the range of 10–40%, which comprises a finely ground fibrous by-product from the group of corn bran, soy hulls, malt husks, oat feed, wheat bran, barley hulls and extracted corn germ, and said fibrous by-product being blended with an auxiliary amylaceous material in the form of cereal flours, starches, or fractions thereof, derived from the group comprising corn, sorghum, wheat, rice, barley, oats, and other cereal grains to provide a room temperature to 32° C viscosity of between 1,000 and 5,000 CPS at 20 rpm for the combination.

4. An adhesive consisting of a combination of urea-formaldehyde resin present in the range of 20–40%, water in the range of 25–60%, filler in the range of 2–4%, catalyst in the range of 1–4%, and an extender in the range of 10–40%, which comprises a finely ground fibrous by-product from the group of corn bran, soy hulls, malt husks, oat feed, wheat bran, barley hulls and extracted corn germ, and said fibrous by-product being blended with an auxiliary amylaceous material in the form of cereal flours, starches, or fractions thereof, derived from the group comprising corn, sorghum, wheat, rice, barley and oats to provide a room temperature to 32° C viscosity of between 1,000 and 5,000 CPS at 20 rpm for the combination and wherein the combination is neutral or slightly acidic and said high fiber by-product has substantially greater water absorption properties than the auxiliary amylaceous material.

5. An adhesive with a water absorption viscosity system and employing starches in a neutral to acidic mix, the combination of urea-formaldehyde resin present in the range of 20–40%, water in the range of 25–60%, filler in the range of 2–4%, catalyst in the range of 1–4%, and an extender in the range of 10–40%, which comprises a finely ground fibrous by-product having generally a viscosity above the desired adhesive viscosity selected from the group of corn bran, soy, hulls, malt husks, oat feed, wheat bran, barley hulls and extracted corn germ, and said fibrous by-product being blended with an auxiliary amylaceous material in the form of cereal flours, starches, or fractions thereof, derived from the group comprising corn, sorghum, wheat, rice, barley, oats, and other cereal grains having a generally lower viscosity than said fibrous by-product to provide room temperature to 32° C viscosity of between 1,000 and 5,000 CPS at 20 rpm for the combination.

6. An adhesive in accordance with claim 1 wherein said filler is from the group of ground clays, wood-fiber base products, bark walnut shell and coconut shell, flours and the fibrous residues from the production of furfural.

7. An adhesive with a water absorption viscosity system and employing starches in a neutral to acidic mix, the combination of urea-formaldehyde resin present in the range of 20–40%, water in the range of 25–60%, filler in the range of 2–4%, catalyst in the range of 1–4%, and an extender in the range of 10–40% which comprises a blend of 0–80% finely ground cereal-derived high fiber by-product and 100–0% of an auxiliary amylaceous extender to provide a room temperature to 32° C viscosity of between 1,000 and 5,000 CPS at 20 rpm for the combination.

8. An adhesive with a water absorption viscosity system and employing starches in a neutral to acidic mix, the combination of urea-formaldehyde resin present in the range of 20–40%, water in the range of 25–60%, filler in the range of 2–4%, catalyst in the range of 1–4%, and an extender in the range of 10–40% which comprises a blend of 0–80% corn bran, 100–0% sorghum hulls to provide a room temperature to 32° C viscosity of between 1,000 and 5,000 CPS at 20 rpm for the combination.

9. In a method of manufacturing a plywood adhesive with a water absorption viscosity system and employing starches in a neutral to acidic mix, wherein urea-formaldehyde resin is present in the range of 20–40%, water in the range of 25–60%, filler in the range of 2–4%, catalyst in the range of 1–4%, and an amylaceous extender in the range of 10–40% are combined, the improvement comprising the step of controlling the viscosity of the adhesive by blending the amylaceous extender from a finely ground fibrous by-product having generally a viscosity above the desired viscosity selected from the group of corn bran, soy hulls, malt husks, oat feed, wheat bran, barley hulls and extracted corn germ, with an auxiliary amylaceous material having a generally lower viscosity than said fibrous by-product, said auxiliary amylaceous material comprising cereal flours, starches, or fractions thereof, derived from the group comprising corn, sorghum, wheat, rice, barley, oats, and cereal grains, to provide room temperature to 32° C viscosity of between 1,000 and 5,000 CPS at 20 rpm for the combination.

* * * * *

UNITED STATES PATENT AND TRADEMARK OFFICE
CERTIFICATE OF CORRECTION

PATENT NO. : 4,070,314
DATED : January 24, 1978
INVENTOR(S) : Richard J. Alexander and Robert K. Krueger It is certified that error appears in the above-identified patent and that said Letters Patent are hereby corrected as shown below:

Column 9, Line 4 delete "desired viscosity" and substitute --- desired adhesive viscosity ---

Signed and Sealed this

Twenty-seventh Day of June 1978

[SEAL]

Attest:

RUTH C. MASON
Attesting Officer

DONALD W. BANNER
Commissioner of Patents and Trademarks